(12) United States Patent
Yao et al.

(10) Patent No.: US 8,540,956 B2
(45) Date of Patent: Sep. 24, 2013

(54) METHOD FOR PREPARING TITANIUM-SILICALITE MOLECULAR SIEVE AND METHOD FOR PREPARING CYCLOHEXANONE OXIME USING TITANIUM-SILICALITE MOLECULAR SIEVE

(75) Inventors: Pin-To Yao, Taipei (TW); Cheng-Fa Hsieh, Taipei (TW); Shih-Yao Chao, Taipei (TW); Yang-Min Liang, Taipei (TW)

(73) Assignee: China Petrochemical Development Corporation, Taipei (TW)

( * ) Notice: Subject to any disclaimer, the term of this patent is extended or adjusted under 35 U.S.C. 154(b) by 604 days.

(21) Appl. No.: 12/748,932

(22) Filed: Mar. 29, 2010

(65) Prior Publication Data

US 2011/0144328 A1    Jun. 16, 2011

(30) Foreign Application Priority Data

Dec. 11, 2009   (TW) ............................... 98142427 A

(51) Int. Cl.
*C01B 39/02* (2006.01)
*C01B 39/04* (2006.01)

(52) U.S. Cl.
CPC ............... *C01B 39/023* (2013.01); *C01B 39/04* (2013.01)
USPC ........... 423/326; 423/701; 423/702; 423/707; 423/709

(58) Field of Classification Search
USPC .......................... 423/701, 702, 707, 709, 326
See application file for complete search history.

(56) References Cited

U.S. PATENT DOCUMENTS

| | | | |
|---|---|---|---|
| 4,410,501 A | 10/1983 | Taramasso et al. | |
| 5,500,199 A | 3/1996 | Bellussi et al. | |
| 6,106,803 A * | 8/2000 | Hasenzahl et al. | 423/705 |
| 6,524,984 B2 | 2/2003 | Carati et al. | |
| 6,627,175 B2 * | 9/2003 | Schoebrechts | 423/713 |
| 6,746,660 B1 * | 6/2004 | Chiang et al. | 423/702 |
| 6,843,978 B2 * | 1/2005 | Canos et al. | 423/713 |
| 7,029,642 B2 * | 4/2006 | Barea et al. | 423/329.1 |
| 7,081,237 B2 * | 7/2006 | Mueller et al. | 423/705 |
| 2008/0253959 A1 * | 10/2008 | Johnson et al. | 423/702 |

* cited by examiner

*Primary Examiner* — David M Brunsman
(74) *Attorney, Agent, or Firm* — Edwards Wildman Palmer LLP; Peter F. Corless; Richard B. Emmons

(57) ABSTRACT

The present invention provides a method for preparing large particles of titanium-silicalite molecular sieves. The method of the present invention includes the steps of preparing a dispersion solution of a primary crystalline molecular sieve; forming an aggregated particle solution by adding a flocculating agent and a coagulating agent into the dispersion solution; mixing the aggregated particle solution with a synthesis gel to form a mixture; and heat-treating the mixture. The average diameter of the titanium-silicalite molecular sieves in the present invention is more than 5 μm. In the preparation of cyclohexanone oxime using the molecular sieve of the present invention as the catalyst, the selectivity and conversion rate of cyclohexanone oxime are high, the usage of hydrogen peroxide is enhanced, and the catalyst is easy to be recovered.

16 Claims, No Drawings

METHOD FOR PREPARING TITANIUM-SILICALITE MOLECULAR SIEVE AND METHOD FOR PREPARING CYCLOHEXANONE OXIME USING TITANIUM-SILICALITE MOLECULAR SIEVE

BACKGROUND OF THE INVENTION

1. Field of the Invention

The present invention relates to methods for preparing a titanium-silicalite molecular sieve, and more particular to, a method for preparing large particles of titanium-silicalite molecular sieves.

2. Description of the Prior Art

Crystalline titanium-silicalite molecular sieves are formed by incorporating titanium into the zeolite structure of silicon dioxide, and have the MFI structures, which are also named as the TS-1 molecular sieves. U.S. Pat. No. 4,410,501 discloses the preparation of this molecular sieve. Such a molecular sieve is used as a catalyst in an oxidation reaction with the use of hydrogen peroxide as an oxidant. The particle of this molecular sieve is about 0.2 μm. However, such a catalyst with a diameter of about 0.2 μm applied in the industry (such as the preparation of cyclohexanone oxime from cyclohexanone, ammonia and hydrogen peroxide) still needs to be improved. Thus, the following technologies are developed to enlarge the particle of the molecular sieve, U.S. Pat. Nos. 5,500,199, 6,106,803 and 6,524,984 disclose that small particles are aggregated by an inorganic adhesive agent, and then spry-dried. The particle of the catalyst in these methods is enlarged; however, the active site of the catalyst is covered by the adhesive agent, the reactivity of the catalyst is decreased, and the amount of the catalyst in the reaction needs to be increased.

Hence, it is an urgent issue to develop a method for preparing a titanium-silicalite molecular sieve with a large particle size and high activity so as to facilitate the recovery of the molecular sieve, improve the usage efficiency of hydrogen peroxide, and favor the application in the industry.

SUMMARY OF THE INVENTION

The present invention provides a method for preparing a titanium-silicalite molecular sieve. The method of the present invention includes the steps of preparing a dispersion solution of a primary crystalline molecular sieve; forming an aggregated particle solution by adding a flocculating agent and a coagulating agent into the dispersion solution; mixing the aggregated particle solution with a synthesis gel to form a mixture; and heat treating the mixture. The average diameter of the titanium-silicalite molecular sieve in the present invention is more than 5 μm, such that the titanium-silicalite molecular sieve is used as a catalyst for achieving high conversion rate and selectivity, and is easy to be filtered.

DETAILED DESCRIPTION OF THE INVENTION

The following specific embodiments are provided to illustrate the disclosure of the present invention. These and other advantages and effects can be easily understood by those skilled in the art after reading the disclosure of this specification.

In the present invention, the water-heated and uncalcined molecular sieve powders (TS-1, S-1 or the combination thereof) are used as the primary crystalline molecular sieves. The primary crystalline molecular sieve powders are dispersed in water to form a dispersion solution. Then, the flocculating agent and the coagulating agent are added into the dispersion solution for aggregating particles, so as to form an aggregated particle solution. The aggregated particle solution is then mixed with the synthesis gel to form a mixture. The mixture is provided in the stainless pressure container having the teflon liner to be water-heated. Generally, the weight ratio of the primary crystalline molecular sieves to the synthesis gel is in a range of from 1:10 to 1:800, preferably in a range of from 1:10 to 1:300, and more preferably in a range of from 1:11.6 to 1:167.

In the present invention, the flocculating agent is a high molecular weight flocculating agent. More specifically, the flocculating agent can be one selected from the group consisting of a cationic flocculating agent, an anionic flocculating agent, an ampholytic flocculating agent and a combination thereof. For example the cationic flocculating agent can be quaternary ammonium salt polymers (such as dimethyl diallyl ammonium chloride polymers or poly(trimethylaminoethyl methacrylate) polymers,) polyvinyl ammonium, polyvinyl pyridine, or a combination thereof. The anionic flocculating agent can be copolymers of sodium polyacrylate and acrylamide or copolymers of sodium acrylate and acrylamide. The anpholytic flocculating agent can be copolymers of quaternary ammonium acrylate and sodium acrylate. Generally, the molecular weight of the flocculating agent of the present invention is of more than 100,000, and preferably in a range of from 100,000 to 20,000,000. The flocculating agent can be an aqueous solution. The concentration of the flocculating agent is in a range of from 0.1 to 1 wt %, preferably in a range of from 0.2 to 0.8 wt %, and more preferably in a range of from 0.3 to 0.6 wt %. The amount of the flocculating agent used for 100 g of the synthesis gel is in a range of from 0.0001 to 0.05 g, preferably in a range of from 0.0001 to 0.03 g, and more preferably in a range of from 0.001 to 0.025 g.

In the present invention, the coagulating agent can be silicate, polyethoxysilane or a silicon dioxide gel solution. For example, the silicate can be tetraethyl silicate, tetraethyl silicate, tetrapropyl silicate, tetrabutyl silicate or a combination thereof. The polyethoxysilane can be ES-28 (n=1-2), ES-32 (n=3-4), ES-40 (n=4-5) or a combination thereof. The silicon dioxide gel solution can be Ludox AS-40, Ludox AS-30, Ludox AM-30, Ludox TM-40, Ludox TM-50, Ludox AM-30, Ludox FIS-30, Ludox HS-40 (purchased from DuPont Company) or a combination thereof. In the method of the present invention, the amount of the coagulating agent used for 100 g of the synthesis gel is in a range of from 0.1 to 6 g, and preferably in a range of from 0.1 to 3 g.

In one embodiment of the present invention, the synthesis gel of the present invention is prepared by the following method. The titanium source (such as tetraalkyl titanate, titanium trichloride, titanium tetrachloride or titanium sulfate) is provided in a reactor. Alternatively, the titanium source is fed into a nitrogen-sealed single-neck flask. The reaction system is cooled to 5° C., and the solvent (such as anhydrous isopropanol or water) is subjected to the above-mentioned nitrogen-sealed single-neck flask, and then stirred for 15 minutes. The silicon source is drooped into the nitrogen-sealed single-neck flask via a charging hopper, and then stirred for 1 hour. After the temperature of the reaction system is risen back to the room temperature, the solvent is removed so as to obtain the synthesis gel. For example, the alcohol is removed at 80° C. for 2 hours. In the method for preparing the synthesis gel of the present invention, the molar ratio of the titanium source to the silicon source ranges from 0.005:1 to 0.06:1, preferably from 0.015:1 to 0.05:1, and more preferably from 0.02:1 to 0.045:1. The molar ratio of the templating agent to the silicon source is in a range of from 0.1:1 to 0.5:1, preferably in a range of from 0.15:1 to 0.45:1, and more preferably in a range of from 0.2:1 to 0.4:1. The molar ratio of the anhydrous isopropanol to the silicon source ranges from 1:1 to 4.5:1, preferably from 1.8:1 to 3.5:1, and more preferably from 2.2:1 to 3:1. The molar ratio of the water to the silicon source is in a range of from 10:1 to 80:1, preferably in a range of from 20:1 to 60:1, and more preferably in a range of from 30:1 to 50:1.

In the method of the present invention, water is used as the medium in the step of heat treating at a proper temperature, allowing the reaction to be performed with the pressure produced in the sealed reactor. In one embodiment, the water-heating is performed, the stainless pressure container having the teflon liner is used as the reactor, the reactor is sealed, and then the reactor is heated for the reaction, so as to form large particles of titanium-silicalite molecular sieves. The step of water-heating is performed at a temperature ranging from 100 to 220° C., and preferably from 150 to 180° C. The step of water-heating is performed for 72 to 240 hours, and preferably for 120 to 192 hours.

In the method of the present invention, after the step of water-heating, the solid phase is separated from the liquid phase, and the solid phase is washed with water, dried, and then calcined. The large particles of titanium-silicalite molecular sieves are thus obtained to be used as the catalyst in the preparation of cyclohexanone oxime. The calcination is performed at a temperature ranging from 450 to 650° C., and preferably from 500 to 550° C. The calcination is performed for 6 to 48 hours, and preferably for 12 to 36 hours.

The average diameter of the titanium-silicalite molecular sieves in the present invention is more than 5 µm, such that the titanium-silicalite molecular sieves of the present invention are suitable to be the catalyst in the preparation of cyclohexanone oxime. The present invention further provides a method for preparing cyclohexanone oxime by using the titanium-silicalite molecular sieve as a catalyst in a presence of a solvent, of which reaction of cyclohexanone, ammonia and hydrogen peroxide is performed to form the cyclohexanone oxime. The reaction is performed at a pressure of 1 atm or higher and at a temperature ranging from 40 to 110° C., and more preferably from 50 to 90° C. In the reaction, the amount of the catalyst is of 0.1 to 10 wt %, and more preferably of 1 to 5 wt % of total weight of reactants. The molar ratio of the ammonia to the cyclohexanone is in a range of from 1.2:1 to 2:1, and more preferably in a range of from 1.4:1 to 1.8:1. The molar ratio of the hydrogen peroxide to the cyclohexanone a ranges from 0.7:1 to 2.0:1, and more preferably from 1.0:1 to 1.5:1. The concentration of the hydrogen peroxide solution is of 30 to 50%, and the hydrogen peroxide solution is gradually added during the reaction. The preparation of cyclohexanone oxime can be performed in the presence of a solvent. The solvent can be a polar solvent such as alcohols, ketones or water. Preferably, the solvent is tert-butanol.

The present invention is illustrated by, but not limited to, the following embodiments.

Preparation 1

500 mL round-bottomed flask was sealed in vacuum system, and then 1.98 g of tetrabutyl titanate was added into the sealed flask. The sealed flask was cooled to 5° C. 20 g of anhydrous isopropanol was injected into the sealed flask and stirred. After the temperature was balanced, 30 g of tetraethyl silinate was dropped into the sealed flask via a charging system at the constant pressure, and then stirred for 1 hour. 28 g (40%) of tetrapropyl ammonium hydroxide solution was dropped into the sealed flask via the charging system at the constant pressure, and then stirred for 1 hour. After the temperature of the reaction system was risen back to the room temperature, the mixture was stirred for 1 hour. The step of removing alcohol was performed at 80° C. for 2 hours, and then water was added to make total weight up to 100 g, so as to form 100 g of synthesis gel.

Comparative Example 1

The synthesis gel prepared from Preparation 1 was fed into and sealed in the stainless pressure container having the teflon liner, and then water-heated at 170° C. for 10 hours. The solid phase was separated from the liquid phase, and washed with water to be neutral. The solid phase was then dried at 100° C., and calcined at 500° C. for 24 hours, so as to obtain the control catalyst sample 1. The average diameter of the control catalyst sample 1 was 1.1 µm, and the median value ($d_{50}$) of the diameter is 0.5 µm.

Embodiment 1

0.8 g of the uncalcined titanium-silicalite molecular sieve (TS-1) was dispersed in 40 mL of water by stirring. 3.5 mL (0.5 wt %) of the anionic flocculating agent (copolymers of sodium acrylate and acrylamide, average molecular weight being from 15,000,000 to 20,000,000) solution was added into the dispersion solution, and stirred for 1 hour. Then, 1.5 g of tetramethyl silinate was added into the mixture, and then the mixture with the 1.5 g of tetramethyl silinate was stirred for 1 hour, so as to form the aggregated particle solution.

The aggregated particle solution was mixed with 100 g of the synthesis gel formed in Preparation 1, and then stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 1 of the titanium-silicalite molecular sieve. The average diameter of the sample 1 was 24.2 µm, and the median value ($d_{50}$) of the diameter is 15.3 µm.

Embodiment 2

0.7 g of the uncalcined titanium-silicalite molecular sieve (TS-1) was dispersed in 40 mL of water by stirring. 1.5 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 0.43 g of ES-40 was added into the mixture, and then the mixture with 0.43 g of ES-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 2 of the titanium-silicalite molecular sieve. The average diameter of the sample 2 was 8.9 µm, and the median value ($d_{50}$) of the diameter is 8.24 µm.

Embodiment 3

0.7 g of the uncalcined titanium-silicalite molecular sieve (TS-1) was dispersed in 40 mL of water by stirring. 0.2 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 0.43 g of ES-40 was added into the mixture, and then the mixture with 0.43 g of ES-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 192 hours. The solid phase was separated from the liquid phase, and washed with water to be neutral. The solid phase was then dried at 100° C., and calcined at 500° C. for 24 hours, so as to obtain the sample 3 of the titanium-silicalite molecular sieve. The average diameter of the sample 3 was 14.7 μm, and the median value ($d_{50}$) of the diameter is 11.9 μm.

Embodiment 4

0.7 g of the uncalcined titanium-silicalite molecular sieve (TS-1) was dispersed in 40 mL of water by stirring. 1.5 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 1.068 g of ES-40 was added into the mixture, and then the mixture with 1.068 g of ES-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 4 of the titanium-silicalite molecular sieve. The average diameter of the sample 4 was 8.4 μm, and the median value ($d_{50}$) of the diameter is 7.8 μm.

Embodiment 5

8.64 g of the uncalcined titanium-silicalite molecular sieve (TS-1) was dispersed in 40 mL of water by stirring. 1.5 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 0.43 g of ES-40 was added into the mixture, and then the mixture was stirred for 1 hour, so as to form the aggregated particle solution.

The aggregated particle solution was mixed with 100 g of the synthesis gel formed in Preparation 1, and then the mixture was stirred for 1 hour. The mixture was provided and sealed in the stainless pressure container having the teflon liner, and water-heated at 160° C. for 240 hours. The solid phase was separated from the liquid phase, and washed with water to be neutral. The solid phase was then dried at 100° C., and calcined at 500° C. for 24 hours, so as to obtain the sample 5 of the titanium-silicalite molecular sieve. The average diameter of the sample 5 was 5.9 μm, and the median value ($d_{50}$) of the diameter is 5.3 μm.

Embodiment 6

0.6 g of the uncalcined titanium-silicalite molecular sieve (TS-1) was dispersed in 40 mL of water by stirring. 0.2 mL (0.5 wt %) of the cationic flocculating agent (dimethyl diallyl ammonium chloride polymers, average molecular weight being 8,000,000 to 12,000,000) solution was added into the dispersion solution, and stirred for 1 hour. Then, 0.43 g of ES-40 was added into the mixture, and then the mixture with 0.43 g of ES-40 was stirred for 1 hour, so as to form the aggregated particle solution.

The aggregated particle solution was mixed with 100 g of the synthesis gel formed in Preparation 1, and then the mixture was stirred for 1 hour. The mixture was then fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 6 of the titanium-silicalite molecular sieve. The average diameter of the sample 6 was 15.3 μm, and the median value ($d_{50}$) of the diameter is 13.1 μm.

Embodiment 7

0.6 g of the uncalcined titanium-silicalite molecular sieve (TS-1) was dispersed in 40 mL of water by stirring. 0.2 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 0.43 g of ES-40 was added into the mixture, and then the mixture with 0.43 g of ES-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 7 of the titanium-silicalite molecular sieve. The average diameter of the sample 7 was 12.6 μm, and the median value ($d_{50}$) of the diameter is 9.9 μm.

Embodiment 8

8.64 g of the uncalcined titanium-silicalite molecular sieve (TS-1) was dispersed in 40 mL of water by stirring. 1.5 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 0.43 g of ES-40 was added into the mixture, and then the mixture with 0.43 g of ES-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 168 hours. The solid phase was separated from the liquid phase, and washed with water to be neutral. The solid phase was then dried at 100° C., and calcined at 500° C. for 24 hours, so as to obtain the sample 8 of the titanium-silicalite molecular sieve. The average diameter of the sample 8 was 10.4 μm, and the median value ($d_{50}$) of the diameter is 8.1 μm.

Embodiment 9

2.16 g of the uncalcined titanium-silicalite molecular sieve (S-1) was dispersed in 40 mL of water by stirring, 1.5 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 1.06 g of AS-40 was added into the mixture, and then the mixture with 1.068 of AS-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 9 of the titanium-silicalite molecular sieve. The average diameter of the sample 9 was 9.3 μm, and the median value ($d_{50}$) of the diameter is 6.9 μm.

Embodiment 10

2.16 g of the uncalcined titanium-silicalite molecular sieve (S-1) was dispersed in 40 mL of water by stirring. 1.5 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 0.4244 g of tetramethyl silinate was added into the mixture, and then the mixture with 0.4244 g of tetramethyl silinate was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 10 of the titanium-silicalite molecular sieve. The average diameter of the sample 10 was 6.5 μm, and the median value ($d_{50}$) of the diameter is 5.7 μm.

Embodiment 11

2.16 g of the uncalcined titanium-silicalite molecular sieve (S-1) was dispersed in 40 mL of water by stirring. 1.5 mL (0.5 wt %) of the anionic flocculating agent (copolymers of sodium acrylate and acrylamide, average molecular weight being 15,000,000 to 20,000,000) solution was added into the dispersion solution, and stirred for 1 hour. Then, 0.4180 g of tetraethyl silinate was added into the mixture, and then the mixture with 0.4180 g of tetraethyl silinate was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 11 of the titanium-silicalite molecular sieve. The average diameter of the sample 11 was 8.2 μm, and the median value ($d_{50}$) of the diameter is 6.6 μm.

Embodiment 12

0.6 g of the uncalcined titanium-silicalite molecular sieve (S-1) was dispersed in 40 mL of water by stirring. 0.2 mL (0.5 wt %) of the cationic flocculating agent (dimethyl diallyl ammonium chloride polymers, average molecular weight being 8,000,000 to 12,000,000) solution was added into the dispersion solution, and stirred for 1 hour. Then, 0.43 g of ES-40 was added into the mixture, and then the mixture with 0.43 g of ES-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 170° C. for 120 hours. The solid phase was separated from the liquid phase, and washed with water to be neutral. The solid phase was then dried at 100° C., and calcined at 500° C. for 24 hours, so as to obtain the sample 12 of the titanium-silicalite molecular sieve. The average diameter of the sample 12 was 8.5 μm, and the median value ($d_{50}$) of the diameter is 7.5 μm.

Embodiment 13

8.64 g of the uncalcined titanium-silicalite molecular sieve (S-1) was dispersed in 40 mL of water by stirring. 1.5 mL (0.5 wt %) of the cationic flocculating agent (dimethyl diallyl ammonium chloride polymers, average molecular weight being 8,000,000 to 12,000,000) solution was added into the dispersion solution, and stirred for 1 hour. Then, 1.061 g of AS-40 was added into the mixture, and then the mixture with 1.061 g of AS-40 was stirred for 1 hour, so as to form the aggregated particle solution.

The aggregated particle solution was mixed with 100 g of the synthesis gel formed in Preparation 1, and then the mixture was stirred for 1 hour. The mixture was fed into and sealed in the stainless pressure container having the teflon liner, and water-heated at 180° C. for 120 hours. The solid phase was separated from the liquid phase, and washed with water to be neutral. The solid phase was then dried at 100° C., and calcined at 500° C. for 24 hours, so as to obtain the sample 13 of the titanium-silicalite molecular sieve. The average diameter of the sample 13 was 9.7 μm, and the median value ($d_{50}$) of the diameter is 7.6 μm.

Embodiment 14

The titanium-silicalite molecular sieves prepared from Comparative Example 1 and Embodiments 1-13 were used as catalysts in the preparation of cyclohexanone oxime, and the activity of the titanium-silicalite molecular sieves was evaluated.

0.55 g of the catalyst was provided in the triple-neck flask, and then 5 g of cyclohexanone and 5.43 g of 28% ammonia water were added into the triple-neck flask. Then, the condensing tube and the stirring system were installed to the triple-neck flask. After the temperature of the reaction system reached 60° C., 5.43 g of 35 wt % hydrogen peroxide solution was gradually added into the triple-neck flask, and the reaction for preparing cyclohexanone oxime was performed. Upon one hour after the completion of subjecting the hydrogen peroxide solution, the catalyst was separated from the reactant solution, and the cyclohexanone oxime in the reactant solution was analyzed. The results were shown in Table 1.

TABLE 1

|  | *$C_{Anoe}$ | **$S_{Oxime/Anoe}$ | ***$C_{H2O2}$ | ****$S_{Oxime/H2O2}$ | Average diameter (μm) |
|---|---|---|---|---|---|
| Comparative Example 1 | 99.75% | 98.28% | 99.91% | 88.75% | 1.1 |
| Embodiment 1 | 99.27% | 99.99% | 99.26% | 91.40% | 24.2 |
| Embodiment 2 | 99.25% | 99.57% | 99.53% | 90.31% | 8.9 |
| Embodiment 3 | 99.63% | 99.25% | 98.92% | 90.87% | 14.7 |
| Embodiment 4 | 99.14% | 99.66% | 99.99% | 89.82% | 8.4 |
| Embodiment 5 | 99.35% | 99.52% | 99.36% | 90.15% | 5.9 |
| Embodiment 6 | 99.67% | 99.03% | 98.97% | 91.50% | 15.3 |
| Embodiment 7 | 99.02% | 99.24% | 99.97% | 89.39% | 12.6 |
| Embodiment 8 | 99.21% | 98.49% | 99.21% | 89.50% | 10.4 |
| Embodiment 9 | 99.53% | 98.92% | 99.35% | 90.48% | 9.3 |

TABLE 1-continued

|  | *$C_{Anoe}$ | **$S_{Oxime/Anoe}$ | ***$C_{H2O2}$ | ****$S_{Oxime/H2O2}$ | Average diameter (μm) |
|---|---|---|---|---|---|
| Embodiment 10 | 98.65% | 98.37% | 98.79% | 90.30% | 6.5 |
| Embodiment 11 | 97.49% | 98.89% | 97.84% | 90.41% | 8.2 |
| Embodiment 12 | 99.40% | 98.84% | 98.89% | 92.20% | 8.5 |
| Embodiment 13 | 99.20% | 99.21% | 99.52% | 89.95% | 9.7 |

*$C_{Anoe}$ = conversion rate of cyclohexanone = consumed moles of cyclohexanone/total moles of cyclohexanone × 100%
**$S_{Oxime/Anoe}$ = selectivity of cyclohexanone oxime = produced moles of cyclohexanone oxime/consumed moles of cyclohexanone × 100%
***$C_{H2O2}$ = conversion rate of hydrogen peroxide = consumed moles of hydrogen peroxide/total moles of hydrogen peroxide × 100%
****$S_{Oxime/H2O2}$ = selectivity of hydrogen peroxide = produced moles of cyclohexanone oxime/consumed moles of hydrogen peroxide × 100%

Accordingly, the present invention provides a method for preparing large particles of molecular sieves, and the molecular sieves of the present invention have high catalytic activity. In the preparation of cyclohexanone oxime using the molecular sieve of the present invention as the catalyst, the selectivity and conversion rate of cyclohexanone oxime are high, the usage of hydrogen peroxide is enhanced, and the catalyst is easy to be recovered.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for preparing a titanium-silicalite molecular sieve, comprising the steps of:
    preparing a dispersion solution of a primary crystalline molecular sieve;
    forming an aggregated particle solution by adding a flocculating agent and a coagulating agent into the dispersion solution;
    mixing the aggregated particle solution with a synthesis gel comprising a titanium source and a silicon source to form a mixture; and
    heat-treating the mixture.

2. The method of claim 1, wherein the primary crystalline molecular sieve is one selected from the group consisting of an uncalcined titanium-silicalite molecular sieve powder, a silicon molecular sieve powder and a combination thereof.

3. The method of claim 1, wherein the flocculating agent is one selected from the group consisting of a cationic flocculating agent, an anionic flocculating agent, an ampholytic agent and a combination thereof.

4. The method of claim 1, wherein the flocculating agent is at least one selected from the group consisting of dimethyl diallyl ammonium chloride polymers, poly(trimethylaminoethyl methacrylate) polymers, polyvinyl ammonium, polyvinyl pyridine, copolymers of sodium polyacrylate and acrylamide, copolymers of sodium acrylate and acrylamide, and copolymers of quaternary ammonium acrylate and sodium acrylate, and an average molecular weight of the flocculating agent is of more than 100,000.

5. The method of claim 1, wherein an amount of the flocculating agent used for 100 g of the synthesis gel is in a range of from 0.0001 to 0.05 g.

6. The method of claim 1, wherein the flocculating agent is a flocculating solution in a concentration ranging from 0.1 to 1 wt %.

7. The method of claim 1, wherein the coagulating agent is at least one selected from the group consisting of silicate, polyethoxysilane and a silicon dioxide gel solution, and an amount of the coagulating agent used for 100 g of the synthesis gel is in a range of from 0.1 to 6 g.

8. The method of claim 1, wherein a weight ratio of the primary crystalline molecular sieve to the synthesis gel is in a range of from 1:10 to 1:800.

9. The method of claim 1, wherein the synthesis gel is formed by the steps of:
    providing a titanium source in a nitrogen-sealed reactor;
    providing a solvent in the nitrogen-sealed reactor;
    dropping a silicon source in the nitrogen-sealed reactor at constant pressure;
    dropping a templating agent in the nitrogen-sealed reactor at constant pressure; and
    removing the solvent to form the synthesis gel.

10. The method of claim 9, wherein the titanium source is tetraalkyl titanate, and the silicon source is tetraalkyl silicate.

11. The method of claim 9, wherein the solvent is anhydrous isopropanol, and the templating agent is tetrapropyl ammonium hydroxide.

12. The method of claim 11, wherein a molar ratio of the anhydrous isopropanol to the silicon source is in a range of from 1:1 to 4.5:1.

13. The method of claim 9, wherein a molar ratio of the titanium source to the silicon source is in a range of from 0.005:1 to 0.06:1, and a molar ratio of the templating agent to the silicon source is in a range of from 0.1:1 to 0.5:1.

14. The method of claim 1, wherein the step of heat-treating is performed at a temperature in a range of from 100 to 220° C. for 72 to 240 hours.

15. The method of claim 1, further comprising the steps of water washing, drying and calcining after the step of heat treating.

16. The method of claim 1, wherein an average diameter of the titanium-silicalite molecular sieve is more than 5 μm.

* * * * *